(12) United States Patent
Yamaguchi

(10) Patent No.: US 7,330,241 B2
(45) Date of Patent: Feb. 12, 2008

(54) OPTICAL DISTANCE MEASURING SENSOR, SELF-PROPELLED CLEANER, AND AIR CONDITIONER

(75) Inventor: Akifumi Yamaguchi, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 11/258,004

(22) Filed: Oct. 26, 2005

(65) Prior Publication Data
US 2006/0087640 A1    Apr. 27, 2006

(30) Foreign Application Priority Data
Oct. 26, 2004    (JP)    ............................ P2004-310894

(51) Int. Cl.
*G01C 25/00* (2006.01)
(52) U.S. Cl. .................................... 356/4.01
(58) Field of Classification Search ............... 356/4.01
See application file for complete search history.

(56) References Cited

U.S. PATENT DOCUMENTS 5,225,876 A * 7/1993 Lux et al. ................... 396/109
5,913,082 A * 6/1999 Onoda ......................... 396/128
6,084,658 A * 7/2000 Kawabata .................. 356/3.01
7,119,887 B2 * 10/2006 Mizuo et al. .............. 356/5.01

FOREIGN PATENT DOCUMENTS

| JP | 5-312948 A | 11/1993 |
| JP | 3265449 B | 1/2002 |
| JP | 2004-188091 | * 6/2004 |

* cited by examiner

*Primary Examiner*—Thomas H. Tarcza
*Assistant Examiner*—Luke D. Ratcliffe
(74) *Attorney, Agent, or Firm*—Birch, Stewart, Kolasch & Birch, LLP

(57) ABSTRACT

An optical distance measuring device has a substrate (10), a plurality of light emitting elements (1) mounted to the substrate (10), a plurality of light emitting-side lenses (2) placed in one-to-one correspondence with the light emitting elements (1), a position sensing photodetector (3) mounted to the substrate (10), a light receiving-side toroidal lens (4) placed in correspondence with the position sensing photodetector (3), and a controller (6) mounted to the substrate (10). The controller (6) drives each light emitting element (1) at a prescribed timing and processes a signal outputted from the position sensing photodetector (3).

14 Claims, 9 Drawing Sheets

OPTICAL DISTANCE MEASURING SENSOR, SELF-PROPELLED CLEANER, AND AIR CONDITIONER

This nonprovisional application claims priority under 35 U.S.C. §119(a) on Patent Application No. 2004-310894 filed in Japan on Oct. 26, 2004, the entire contents of which are hereby incorporated by reference.

BACKGROUND OF THE INVENTION

The present invention relates to an optical distance measuring sensor that detects the presence of an object to be measured in a prescribed range and measures a direction in which the object is located and a distance to the object. The present invention also relates to a self-propelled cleaner equipped with the optical distance measuring sensor. The present invention also relates to an air conditioner equipped with the optical distance measuring sensor.

Conventionally, ultrasonic sensors, reflection type infrared sensors, infrared distance measuring sensors and so on have been used as sensors intended to detect objects.

Ultrasonic sensors have a wide viewing angle and a long detecting distance, but cannot detect soft objects (futons, blankets, curtains, sofas and so on) because they absorb sound waves. Also, the ultrasonic sensors cannot detect a direction in which an object is located.

Reflection type infrared sensors have a simple structure because they detect reflection of infrared light emitted from a sensor. However, the detection distance varies depending on the color of an object to be detected, so that detected results are unstable due to influence of the color of the object to be detected.

As shown in FIG. 11, a distance measuring sensor using infrared rays is equipped with a light emitting element 101 and a photodetector 103. An object B to be measured is irradiated with infrared rays from the light emitting element 101. Reflected light from the object B is received by the photodetector 103, and a direction in which the object B is located and a distance to the object B are measured (e.g., Japanese Patent Publication No. 5-312948 A).

The distance measuring sensor using infrared rays can accurately detect the distance to the object B because it is hardly influenced by the color of the object B.

However, in the distance measuring sensor using infrared rays, a detection viewing angle is as narrow as ± several degrees because beams emitted from the light emitting element 101 are narrowed. Further, one-beam type sensors, namely sensors having only one light emitting element 101 cannot detect the direction in which the object B to be measured is located. In order to detect this direction, it is required to use a plurality of distance measuring sensors resulting in an increase in size.

It is also possible to generate multi-beams in one distance measuring sensor by using one light emitting-side lens and a plurality of light emitting elements. However, as beams from the light emitting elements become more distant from an optical axis of the lens, a light spot formed on the object to be measured blurs and enlarges due to aberration, thus affecting measurement accuracy. Therefore, the feasible viewing angle is as small as about 30°.

SUMMARY OF THE INVENTION

An object of the present invention is to provide an optical distance measuring sensor that has a wide range of viewing angles and can detect the direction of and distance to an object to be measured within the wide range of viewing angles, and also provide a self-propelled cleaner and an air conditioner that are equipped with such a sensor.

In order to accomplish the object, an optical distance measuring sensor according to the present invention comprises:

a substrate;

a plurality of light emitting elements that are mounted to the substrate and placed in one plane parallel to the substrate;

a plurality of light emitting-side lenses that are placed in one-to-one correspondence with the light emitting elements and collimate light beams emitted from the corresponding light emitting elements;

a single position sensing photodetector mounted to the substrate;

a single light receiving-side toroidal lens placed in correspondence with the position sensing photodetector; and a controller mounted to the substrate and driving each of the light emitting elements at a predetermined timing as well as processing a signal outputted from the position sensing photodetector.

The term "parallel" used herein means not only "completely parallel" but also "roughly parallel". Therefore, it should be understood that the term means parallel to such a degree that it can be regarded as "practically parallel".

In the optical distance measuring sensor of the invention having the provision of the plurality of light emitting elements, the plurality of light emitting-side lenses, the single position sensing photodetector, the single light receiving-side toroidal lens and the controller, each of the light emitting elements is driven at a prescribed timing, a signal outputted from the position sensing photodetector is processed, and the distance to and the direction of an object to be measured are detected using a triangulation method over a wide range.

As described above, the optical distance measuring sensor has a wide range of viewing angles, and can detect the direction in which an object to be measured is located within the wide range of viewing angles as well as the distance to the object. Further, due to the singleness of the position sensing photodetector and the light receiving-side toroidal lens, the size and cost of the optical distance measuring sensor can be reduced.

Because the light emitting elements, the position sensing photodetector, and the controller are mounted on the same substrate, assembly operation is easy and the number of component parts can be reduced.

Since the plurality of light emitting elements are placed on one and the same plane parallel to the substrate, the dimension in a direction perpendicular to the substrate can be reduced, thus making it possible to reduce the thickness of the optical distance measuring sensor. Further, wirings to be connected to each of the light emitting elements (e.g., wirings that connect the light emitting elements to the controller) can have roughly equal lengths.

Since the light receiving-side toroidal lens is used, accuracy in taking the focus on the position sensing photodetector is improved, so that accuracy in the distance measurement is greatly improved.

In one embodiment, the optical distance measuring further comprises a light-shielding plate provided between one pair of associated light emitting element and light emitting-side lens and another pair of associated light emitting element and light emitting-side lens that is adjacent to the one pair of the light emitting element and the light emitting-side lens.

In the embodiment, light beams emitted from one light emitting element are prevented from entering light emitting-side lenses associated with other light emitting elements. Thus, accurate measurement is implemented.

In one embodiment, the optical distance measuring sensor further comprises a supporting member that integrally supports the plurality of light emitting-side lenses and the light receiving-side toroidal lens, and houses the plurality of light emitting elements, the position sensing photodetector, and the controller in a state in which the substrate is mounted to the supporting member.

In this embodiment, the substrate is mounted to the supporting member. This makes it possible to adjust the distance between the light emitting element and the corresponding light emitting-side lens and the distance between the position sensing photodetector and the light receiving-side toroidal lens to desired values at the same time.

In one embodiment, the light emitting elements are five in number, the five light emitting elements are placed in one straight line, and an angle made between optical axes of adjacent light emitting elements is about 22.5°.

The value of "about 22.5°" herein means a value having a tolerance and represents an angle within a range of 22.5°±2.5°.

In this embodiment, the angle made between the optical axes of the light emitting elements located at opposite ends of an array of the light emitting elements is about 90°, which provides an increased viewing angle.

In one embodiment, the supporting member is formed of a conductive material, the substrate has a ground terminal, and the supporting member is electrically connected to the ground terminal of the substrate.

In this embodiment, thanks to the shielding effect of the supporting member, influence of electromagnetic noises from the outside is eliminated, so that stable output is obtained from the light emitting elements and the position sensing photodetector.

In one embodiment, the optical distance measuring sensor comprises a lead frame on which the plurality of light emitting elements are mounted, and a light-permeable sealing portion that encapsulates the plurality of light emitting elements. The lead frame has a protruding portion protruding from the sealing portion parallel to the substrate, the protruding portion has at least one opening, and the supporting member has a projection to be fit in the opening of the protruding portion.

In this embodiment, by fitting the projection of the supporting member in the opening of the protruding portion of the lead frame, the lead frame, and hence, the plurality of light emitting elements are positioned with respect to the supporting member, and hence, with respect to the plurality of light emitting-side lenses. As a result, accuracy in the direction of light emitted from the light emitting element can be improved. Therefore, light emitted from each of the plurality of light emitting elements can reach the object to be measured without deviating from the optical axes of the light emitting-side lenses, so that accurate measurement is achievable.

In one embodiment, the position sensing photodetector has a light-receiving surface divided into minute zones having their respective resistances that increase from one end of the light-receiving surface to the other end.

A direction from the one end to the other end of the light-receiving surface is a direction in which a light spot formed on the light-receiving surface by reflected light from the object to be measured moves according as the distance from the light emitting element to the object increases.

In this embodiment, the relationship between the distance to the object to be measured and the output from the position sensing photodetector becomes roughly linear. Therefore, in a range of long distances to the object B to be measured, it is possible to make a ratio of change in output to change in distance large enough to enable accurate measurement.

In one embodiment, the position sensing photodetector is a two-element photodiode having two light-receiving surfaces.

A boundary between the two light-receiving surfaces of the two-element photodiode is located at a position at which a light spot formed by reflected light from the object to be measured intersects the boundary when the distance from the light emitting element to the object B changes.

In this embodiment, when the light spot formed by reflected light from the object to be measured intersects the boundary between the two light-receiving surfaces, an output from the position sensing photodetector suddenly changes. Therefore, it is possible to accurately measure the distance of the object when it is at or in the vicinity of the distance at which the light spot is located at the boundary between the two light-receiving surfaces.

In one embodiment, the controller outputs a signal according to a sum of quantities of light received by the position sensing photodetector.

In this embodiment, a total intensity of light can separately be detected. Thus, intensity of disturbance light can separately be detected, so that accurate measurement can be achieved.

In one embodiment, the optical distance photodetector further comprises a photodetector different from the position sensing photodetector, and the controller further outputs a signal derived from the light-receiving photodetector.

In this embodiment, a total intensity of light can separately be detected. Thus, intensity of disturbance light can separately be detected, so that accurate measurement can be achieved.

In one embodiment, the optical distance measuring sensor further comprises a pyroelectric sensor having a viewing angle corresponding to a viewing angle formed by the plurality of light emitting elements.

The term "corresponding to" means "practically regarded as the same and a difference, if any, practically does not matter."

The optical distance measuring sensor of this embodiment is able to detect a moving heat source within a range of distance measurement defined by the plurality of light emitting elements. For example, whether an object located within the range of distance measurement is an article or a human body is discriminable.

In one embodiment, the plurality of light emitting elements are divided and arranged in at least two straight lines, and not all together in one straight line.

In this embodiment, light is emitted from the light emitting elements not two-dimensionally, but three-dimensionally, so that the direction of and the distance to the object to be measured are detected three-dimensionally.

A self-propelled cleaner of the present invention is equipped with the optical distance measuring sensor as described above.

The self-propelled cleaner can perform an efficient and automatic cleaning of a room with detection of obstacles and walls inside the room.

An air conditioner of the present invention is equipped with the optical distance measuring sensor as described above.

The air conditioner detects a position in which a human body is located so as to control the direction and intensity of the air, the temperature, etc. into an optimum state. Thus, the air conditioner is user friendly and energy-saving.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE PREFERRED EMBODIMENTS

Figure 1A:
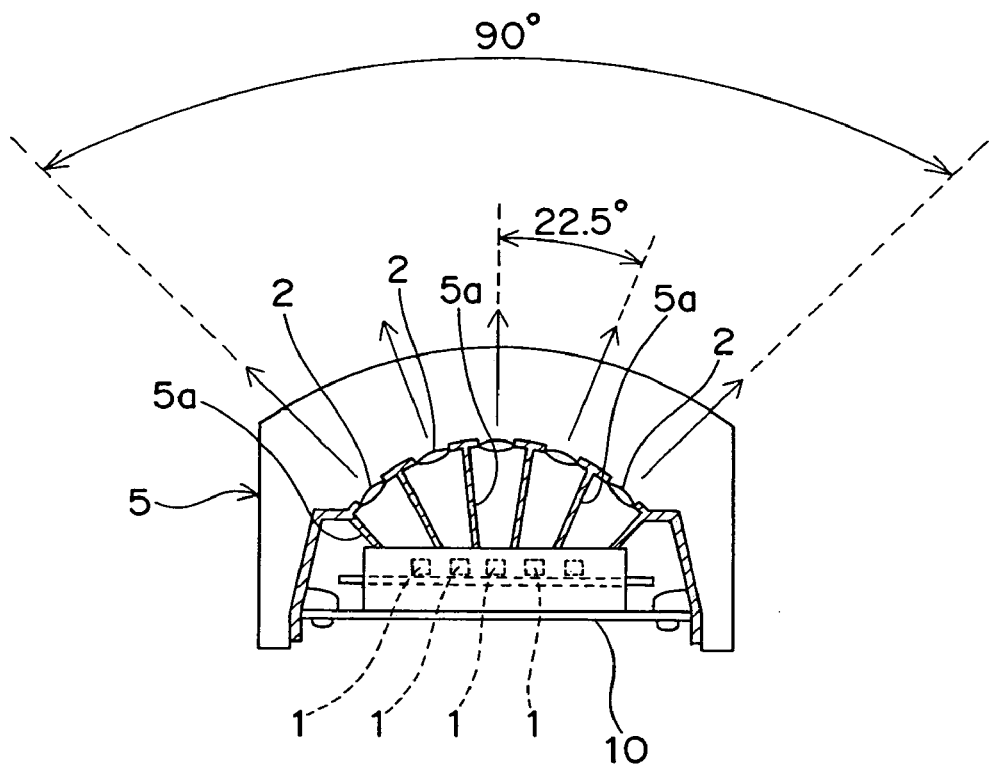
FIG. 1A is a front sectional elevation showing a first embodiment of the optical distance measuring sensor of the present invention.

The present invention will be described in detail below based on the embodiments thereof shown in the drawings.

First Embodiment

Figure 1B:
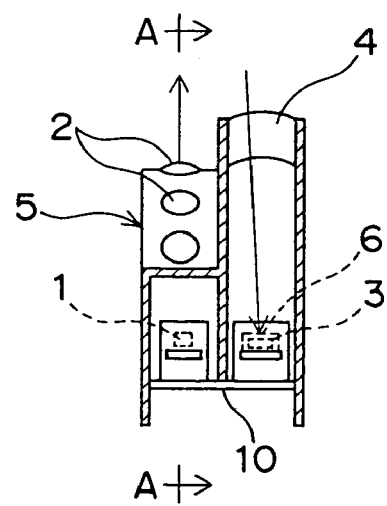
FIG. 1B is a side sectional elevation of the optical distance measuring sensor.

FIG. 1A is a front sectional elevation showing an embodiment of the optical distance measuring sensor of the present invention. FIG. 1B is a side sectional elevation of the optical distance measuring sensor of the present invention. FIG. 1A is a sectional view taken along line A-A of FIG. 1B.

The optical distance measuring sensor is what is called a multi-beam distance measuring sensor. The multi-beam distance measuring sensor includes a substrate 10, a plurality of light emitting elements 1 that are mounted on the substrate 10, a plurality of light emitting-side lenses 2 that are placed in one-to-one correspondence with the light emitting elements 1, a position sensing photodetector 3 mounted on the substrate 10, a light receiving-side toroidal lens 4 placed in correspondence with the position sensing photodetector 3, and a controller 6 mounted on the substrate.

As the light emitting elements 1, for example, LEDs (light-emitting diodes) are used. The light emitting elements 1 are five in number. The five light emitting elements 1 are placed in the same plane roughly parallel to the substrate 10, and in the same straight line.

The light emitting-side lenses 2 make light beams emitted from the associated light emitting elements 1 roughly parallel. The light emitting-side lenses 2 and the light emitting elements 1 are the same in number (five) The five light emitting-side lenses 2 are placed in the same plane roughly perpendicular to the substrate 10 and above (in the light emitting direction of) the plurality of light emitting elements 1. The five light emitting-side lenses 2 are arranged in a roughly arc shape, whose center is located toward the light emitting elements 1.

As the position sensing photodetector 3, for example, a PSD (position sensing detector) is used. The position sensing photodetector 3 is located perpendicular to a direction in which the plurality of light emitting elements 1 are arranged. The light receiving-side toroidal lens 4 is located above the position sensing photodetector 3.

A distance between the position sensing photodetector 3 and the light receiving-side toroidal lens 4 is larger than a distance between the light emitting element 1 and the associated light emitting-side lens 2.

As the controller 6, for example, an IC (integrated circuit) is used. The controller 6 drives each of the light emitting elements 1 at a predetermined timing, and processes a signal outputted from the position sensing photodetector 3.

The light emitting-side lenses 2 and the light receiving-side toroidal lens 4 are integrally supported by the supporting member 5. For example, a casing is used as the supporting member 5. The supporting member 5 houses the plurality of light emitting elements 1, the position sensing photodetector 3 and the controller 6 in a state in which the substrate 10 is mounted to the supporting member.

In the inside of the supporting member 5, there are provided light-shielding plates 5a serving as partition plates between adjacent pairs of a light emitting element 1 and a light emitting-side lens 2 that correspond to each other.

The angle made between optical axes of the adjacent light emitting elements 1 is about 22.5°, and the angle (i.e., viewing angle of the sensor) made between the optical axes of the opposite end light emitting elements 1 of the light emitting element array is about 90°.

Next, the operation of the optical distance measuring sensor with the above construction will be described.

The controller 6 sequentially activates the plurality of light emitting elements 1 on a prescribed cycle. In synchronization therewith, the controller 6 also performs signal processing of an output of the position sensing photodetector 3 so that it is outputted as an output of the sensor.

The optical distance measuring sensor detects the presence of an object to be measured in a prescribed range and measures a direction in which the object is located and a distance from the sensor to the object. The distance to the object is detected using a triangulation method The optical distance measuring sensor with the above construction has a wide range of viewing angles, and can detect the direction and distance of an object to be measured that is located within the wide range of viewing angles. Further, due to the singleness of the position sensing photodetector 3 and the light receiving-side toroidal lens 4, that is, since the position sensing photodetector 3 and the light receiving-side toroidal lens 4 are one in number, the size and cost of the optical distance measuring sensor can be reduced.

Because the plurality of light emitting elements 1, the position sensing photodetector 3 and the controller 6 are mounted to the same substrate 10, the sensor can easily be assembled and the parts count can be reduced.

Since the plurality of light emitting elements 1 are placed in the same plane roughly parallel to the substrate 10 to be flush with each other, the dimension in a direction perpendicular to the substrate 10 (i.e., height) can be reduced, thus making it possible to reduce the thickness of the optical distance measuring sensor. Further, wirings to be connected to each of the light emitting elements (e.g., wirings that connect the individual light emitting elements 1 to the controller 6) can have roughly equal lengths.

The light receiving-side toroidal lens 4 allows accuracy in taking the focus on the position sensing photodetector 3 to be improved, so that accuracy in the distance measurement is greatly improved.

Due to the presence of the light-shielding plates 5a, light beams emitted from one light emitting element 1 are prevented from entering light emitting-side lenses 2 associated with other light emitting elements 1. Thus, accurate measurement is implemented.

Since the supporting member 5 integrally supports the plurality of light emitting-side lenses 2 and the light receiving-side toroidal lens 4, mounting the substrate 10 to the supporting member 5 makes it possible to adjust the distance between the light emitting element 1 and the light emitting-side lens 2 and the distance between the position sensing photodetector 3 and the light receiving-side toroidal lens 4 to desired values at the same time.

The five light emitting elements 1 are placed in the same straight line, and the angle made between the adjacent light emitting elements 1 is about 22.5°. Thus, the angle made between the optical axes of the light emitting elements 1 located at both ends of the light emitting element array is about 90°. Thus the viewing angle is increased.

Figure 2:
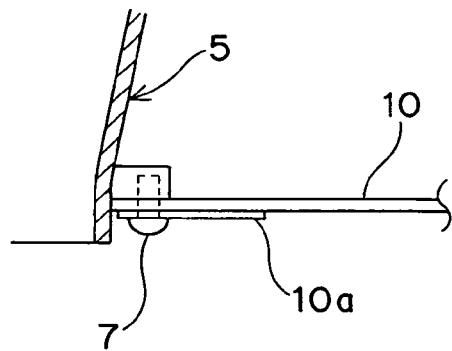
FIG. 2 is an enlarged view showing a connection portion between a substrate and a supporting member.

Referring next to FIG. 2 showing an enlarged view of essential parts, the substrate 10 has a ground pattern 10a serving as a ground terminal. The supporting member 5 is formed of a conductive material such as conductive resin. The supporting member 5 is electrically connected to the ground pattern 10a of the substrate 10 through a metal screw 7.

As described above, the supporting member 5 is formed of a conductive material and electrically connected to the ground pattern 10a of the substrate 10. Thus, thanks to the shielding effect of the supporting member 5, influence of electromagnetic noises from the outside is eliminated, so that stable output is obtained from the light emitting elements 1 and the position sensing photodetector 3. Therefore, accuracy in the distance measurement can be improved more.

Figure 3A:
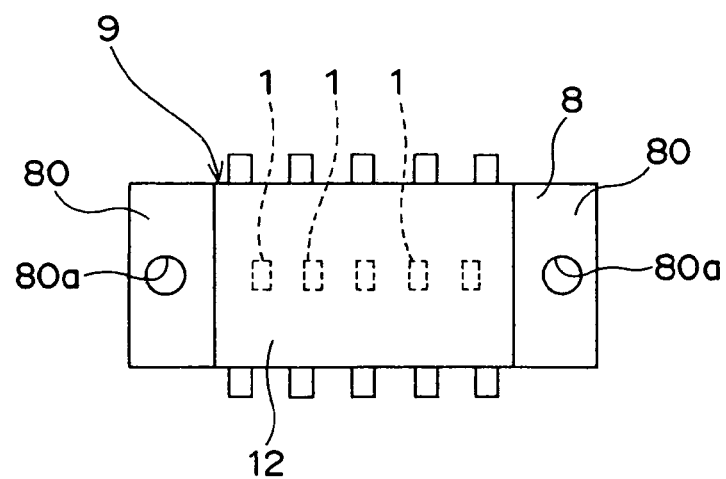
FIG. 3A is a plan view of a light emitting-side device.
Figure 3B:
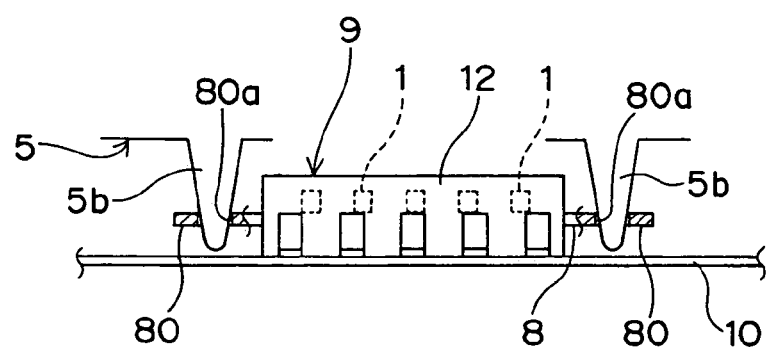
FIG. 3B is a side view of the light emitting-side device.

As shown in a plan view of FIG. 3A and a side view of FIG. 3B, the plurality of light emitting elements 1 are mounted on a lead frame 8 and encapsulated by a light-permeable sealing portion 12. That is, a packaged light emitting device 9 is formed by the plurality of light emitting elements 1, the lead frame 8 and the sealing portion 12.

The lead frame 8 has protruding portions 80 each protruding from the sealing portion 12 roughly parallel to the substrate 10. Each protruding portion 80 has at least one opening 80a. The supporting member 5 has projections 5b to be fit in the respective openings 80a of the protruding portions 80 of the lead frame 8.

By inserting the projections 5b of the supporting member 5 through the openings 80a of the protruding portions 80 of the lead frame 8, the light emitting device 9 is aligned with the light emitting-side lenses 2. That is, the lead frame 8, and hence, the plurality of light emitting elements 1 are positioned with respect to the supporting member 5, and hence, with respect to the plurality of light emitting-side lenses 2. At this time, the lead frame 8 is roughly parallel to the substrate 10.

Therefore, light emitted from each of the plurality of light emitting elements 1 can reach the object to be measured without deviating from the respective optical axes of the light emitting-side lenses 2, so that accurate measurement is achievable. That is, accuracy in the direction of emission from the light emitting element 1 is improved.

Next, the first to third types of the position sensing photodetector 3 will be described below.

The first type of the position sensing photodetector 3 has a light-receiving surface that has a uniform resistance from end to end.

Figure 4A:
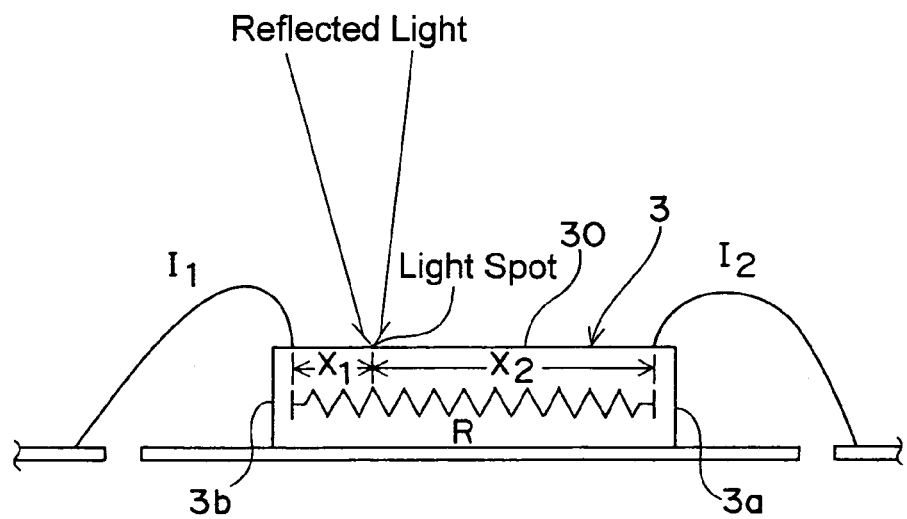
FIG. 4A is a side view showing a first type of a position sensing photodetector.

As shown in FIG. 4A, the light-receiving surface 30 of the position sensing detector 3 has a uniform resistance R from its one end 3a through the other end 3b. Output current is taken out of the one end 3a and the other end 3b.

Figure 4B:
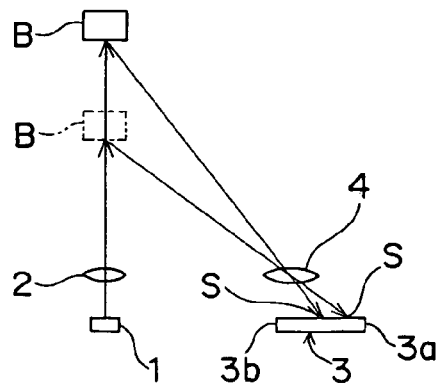
FIG. 4B is an explanatory view showing a relationship between a position of an object to be measured and a position of a light spot.

A direction from the one end 3a to the other end 3b is a direction in which, as shown in FIG. 4B, a light spot S formed on the light-receiving surface 30 by reflected light from the object B to be measured moves according as the distance from the light emitting element 1 to the object B increases as in the movement from a position shown in an imaginary line to a position shown in a solid line.

As shown in FIG. 4A, assume that a current taken out of the one end 3a is $I_2$, that a current taken out of the other end 3b is $I_1$, that the distance of a light spot formed on the light-receiving surface 30 from the one end 3a is $X_2$, while the distance of the light spot from the other end 3b is $X_1$. Then, the relationship of $I_1:I_2=X_2:X_1$ holds.

Figure 4C:
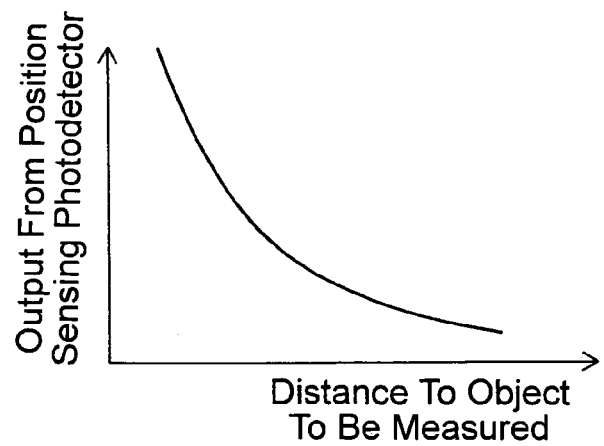
FIG. 4C is a graph schematically showing a relationship between an output from the position sensing photodetector and a distance to the object to be measured.

As shown in FIG. 4C, the output from the position sensing photodetector 3 is in inverse proportion to the distance to the object B to be measured. That is, there arises a difference in output between both the ends of the position sensing photodetector, depending on the position of the light spot formed on the light-receiving surface 30. Since the output ratio, $I_2/(I_1+I_2)$, is used as the output of the position sensing photodetector 3, the output is in inverse proportion to the distance.

The second type of the position sensing photodetector 3 has a light-receiving surface divided into minute zones having their respective resistances that increase from one end of the light-receiving surface to the other end.

Figure 5A:
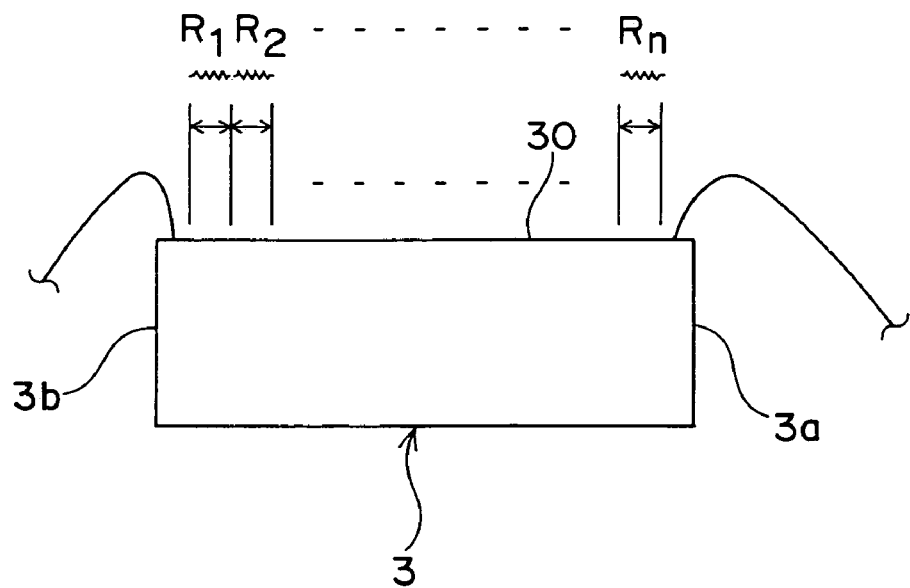
FIG. 5A is a side view showing a second type of the position sensing photodetector.

As shown in FIG. 5A, the resistance of the light-receiving surface 30 of the position sensing photodetector 3 increases stepwise from one end 3a to the other end 3b. Specifically, assuming that the resistances from the other end 3b to the one end 3a are $R_1, R_2, \ldots, R_n$, then, a relationship of $R_1>R_2> \ldots >R_n$ holds.

Figure 5B:
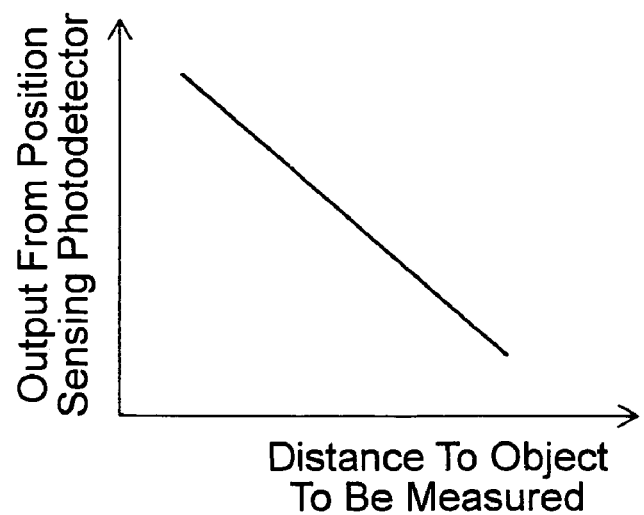
FIG. 5B is a graph schematically showing a relationship between an output from the position sensing photodetector and a distance to the object to be measured.

As shown in FIG. 5B, the relationship between an output from the position sensing photodetector 3 and a distance to the object B to be measured becomes roughly linear. Therefore, in a range of long distances to the object B to be measured, it is possible to make a ratio of change in output to change in distance large enough to enable accurate measurement.

The third type of the position sensing photodetector 3 is a two-element photodiode having two light-receiving surfaces.

Figure 6A:
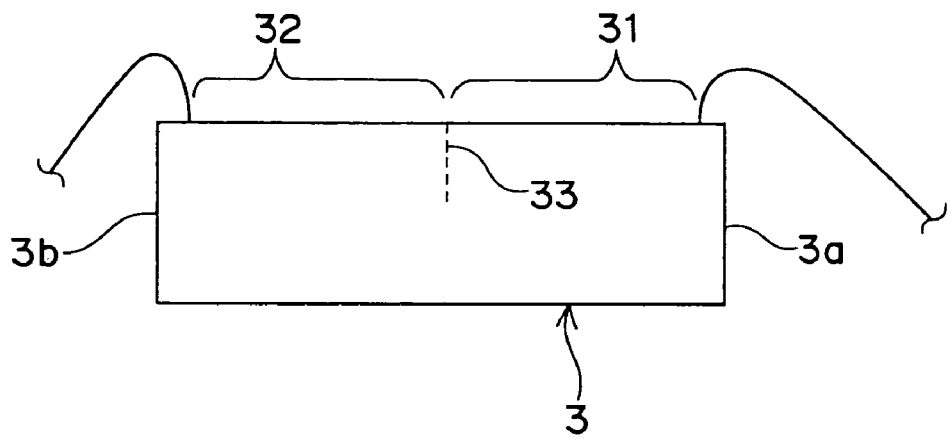
FIG. 6A is a side view showing a third type of the position sensing photodetector.

As shown in FIG. 6A, the position sensing photodetector 3 has a first light-receiving surface 31 on the one end 3a side as well as a second light-receiving surface 32 on the other end 3b side. A boundary 33 between the first light-receiving surface 31 and the second light-receiving surface 32 is located at a position at which a light spot formed by reflected light from the object B to be measured intersects the boundary 33 when the distance from the light emitting element 1 to the object B varies.

Figure 6B:
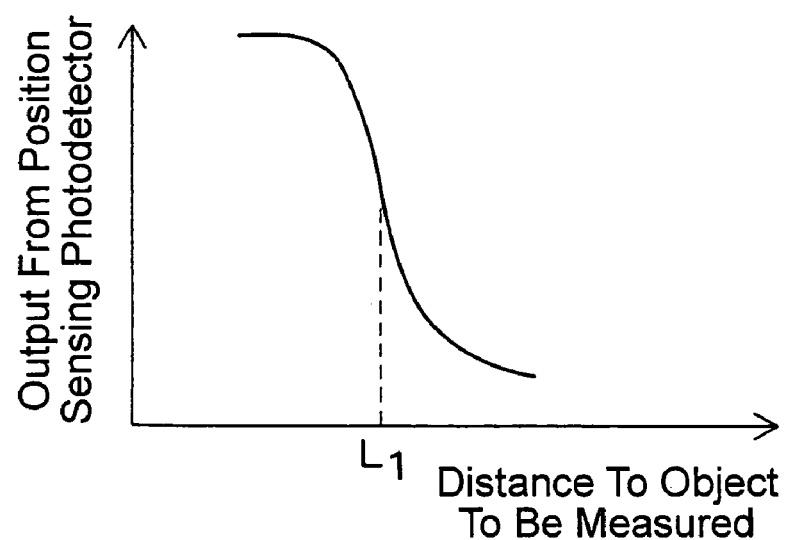
FIG. 6B is a graph schematically showing a relationship between an output from the position sensing photodetector and a distance to the object to be measured.

When the light spot goes across the boundary 33 between the first light-receiving surface 31 and the second light-receiving surface 32, an output from the position sensing photodetector 3 suddenly changes as shown in FIG. 6B. Therefore, it is possible to accurately measure the distance of the object B when it is at or in the vicinity of the distance $L_1$ at which the light spot is located at the boundary 33.

Although not shown, a signal obtained by the sum of quantities of light received by the position sensing photodetector 3 may be outputted by the controller 6. That is, the sum of current taken out of the one end 3a and current taken out of the other end 3b may be outputted. Alternatively, another photodetector is provided separately from the position sensing photodetector 3. Then, a signal obtained by the photodetector may be outputted by the controller 6. By this arrangement, since the total intensity of light is separately and independently detected, intensity of disturbance light can separately be detected, so that accurate distance measurement is achieved.

Figure 7A:
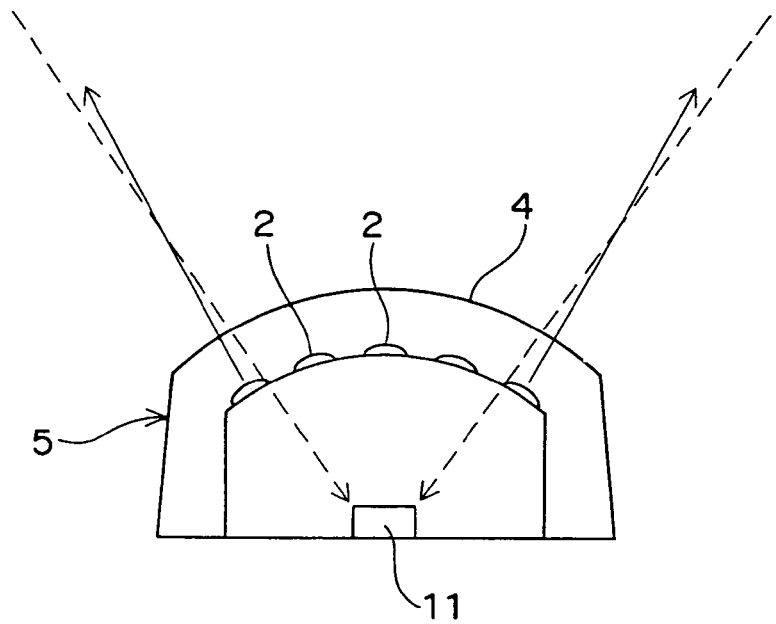
FIG. 7A is a front view showing an optical distance measuring sensor having a pyroelectric sensor.
Figure 7B:
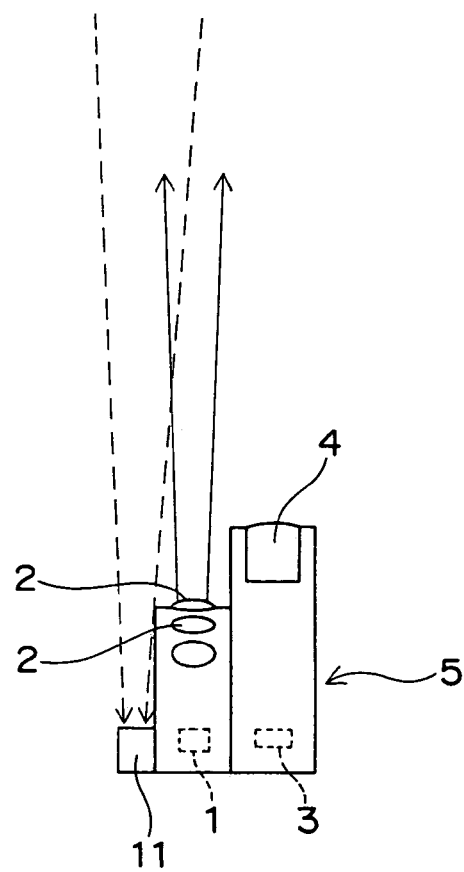
FIG. 7B is a side view showing the optical distance measuring sensor having the pyroelectric sensor.

As shown in a front view in FIG. 7A and a side view in FIG. 7B, a pyroelectric sensor 11 having a viewing angle (shown by broken arrows) that is roughly the same as a viewing angle (shown by solid arrows) formed by the plurality of light emitting elements 1 may be provided. Specifically, the pyroelectric sensor 11 is located across the light emitting elements 1 from the position sensing photodetector 3.

Providing the pyroelectric sensor 11 can detect a moving heat source located within the range of distance measurement defined by the light emitting elements 1. For example, whether the object B to be measured located within the range of distance measurement is an article or a human body can be discriminated.

Figure 8A:
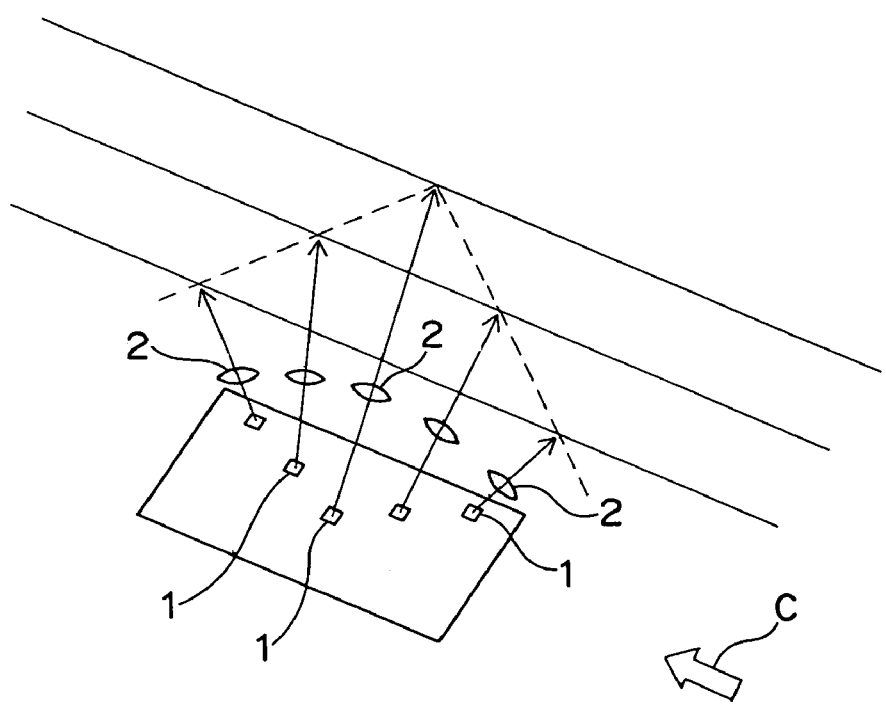
FIG. 8A is a perspective view showing the arrangement of light emitting elements, which enables a three-dimensional distance measurement.
Figure 8B:
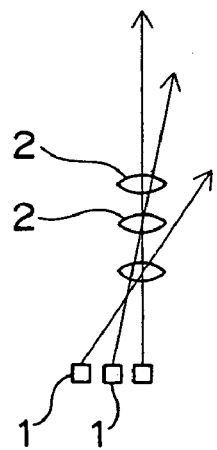
FIG. 8B is a side view showing the arrangement of the light emitting elements, which enables a three-dimensional distance measurement.

As shown in a perspective view of FIG. 8A and a side view of FIG. 8B, the plurality of light emitting elements 1 may be divided and arranged in at least two straight lines, and not all together in one straight line. That is, the plurality of light emitting elements 1 are arranged in a roughly V shape. FIG. 8B is a view seen from the direction of arrow C of FIG. 8A.

By arranging the light emitting elements 1 in this manner, light can be emitted from the plurality of light emitting elements 1 not two-dimensionally, but three-dimensionally via the plurality of light emitting-side lenses 2 arranged in an arc shape, so that the direction and the distance of the object B to be measured can be detected three-dimensionally. Meanwhile, the plurality of light emitting elements 1 may also be arranged in a roughly arc shape.

Second Embodiment

Figure 9:
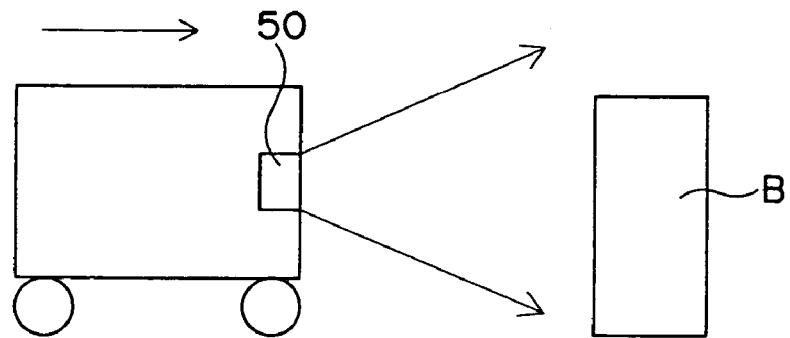
FIG. 9 is a side view showing a self-propelled cleaner of the present invention.

FIG. 9 shows a self-propelled cleaner of the invention. The self-propelled cleaner is equipped with an optical distance measuring sensor 50 of the first embodiment in its traveling direction, for example. Since the cleaner has the optical distance measuring sensor 50, the cleaner can perform an efficient and automatic cleaning of a room with detection of obstacles and walls inside the room as the objects B to be measured.

Third Embodiment

Figure 10:
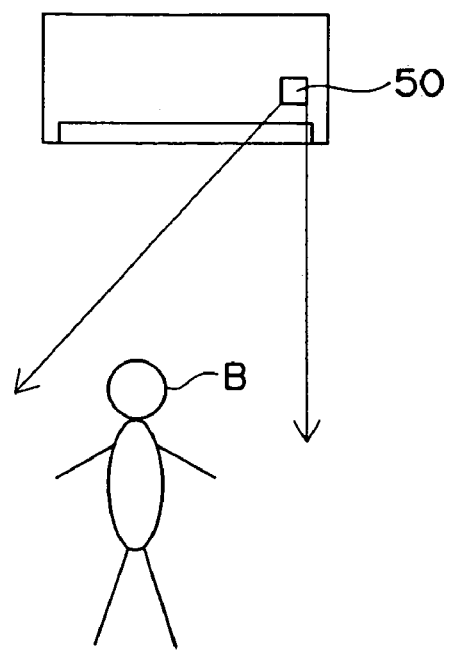
FIG. 10 is a schematic front view showing an air conditioner of the present invention.
Figure 11:
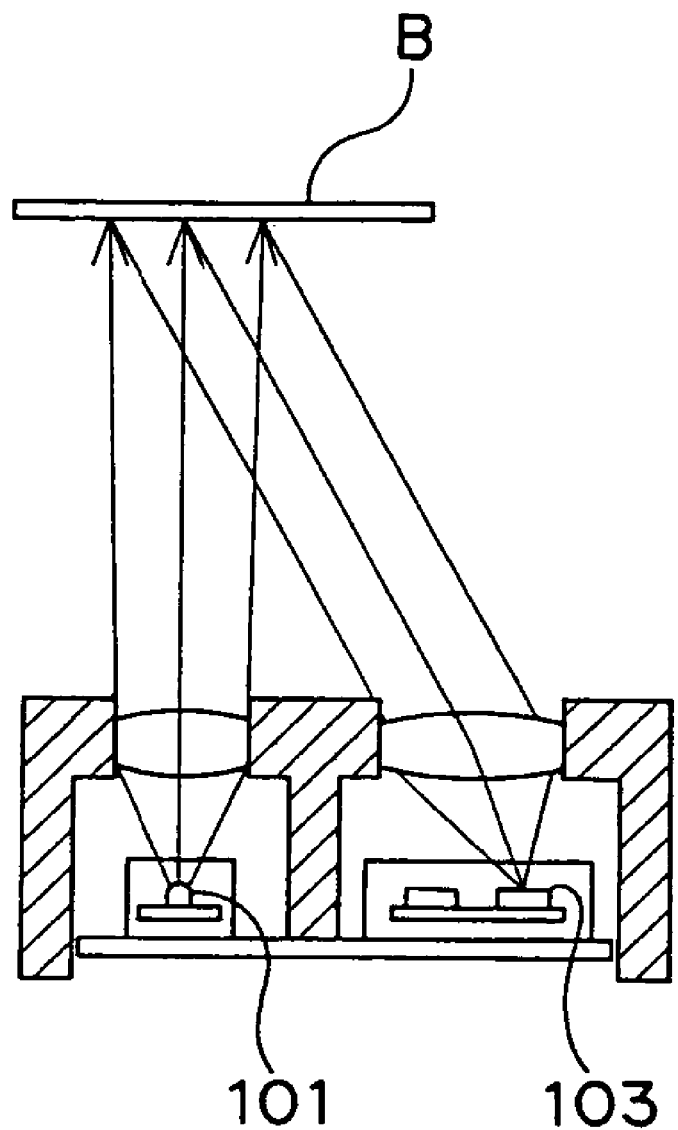
FIG. 11 is a side sectional elevation of a conventional distance measuring sensor.

FIG. 10 shows an air conditioner of the invention. The air conditioner is equipped with the optical distance measuring sensor 50 at the front, for example. Thanks to the optical distance measuring sensor 50, the air conditioner detects a position in which a human body as the object B to be measured is located, so as to control the direction and intensity of the air, the temperature, etc. into an optimum state. Thus, the air conditioner is user friendly and energy-saving.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An optical distance measuring sensor comprising:
   a substrate;
   a plurality of light emitting elements that are mounted to the substrate and placed in one plane parallel to the substrate;
   a plurality of light emitting-side lenses that are placed in one-to-one correspondence with the light emitting elements and collimate light beams emitted from the corresponding light emitting elements;
   a single position sensing photodetector mounted to the substrate;
   a single light receiving-side toroidal lens placed in correspondence with the position sensing photodetector; and
   a controller mounted to the substrate and driving each of the light emitting elements at a predetermined timing as well as processing a signal outputted from the position sensing photodetector.

2. The optical distance measuring sensor as set forth in claim 1, further comprising:
   a light-shielding plate provided between one pair of a light emitting element and a light emitting-side lens that correspond to each other and another pair of a light emitting element and a light emitting-side lens that is adjacent to the one pair of the light-emitting element and the light emitting-side lens.

3. The optical distance measuring sensor as set forth in claim 1, further comprising:
   a supporting member that integrally supports the plurality of light emitting-side lenses and the light receiving-side toroidal lens, and houses the plurality of light emitting elements, the position sensing photodetector, and the controller in a state in which the substrate is mounted to the supporting member.

4. The optical distance measuring sensor as set forth in claim 1, wherein
   the light emitting elements are five in number;

the five light emitting elements are placed in one straight line; and an angle made between optical axes of adjacent light emitting elements is about 22.5°.

5. The optical distance measuring sensor as set forth in claim 3, wherein the supporting member is formed of a conductive material;

the substrate has a ground terminal; and the supporting member is electrically connected to the ground terminal of the substrate.

6. The optical distance measuring sensor as set forth in claim 3, comprising:

a lead frame on which the plurality of light emitting elements are mounted; and a light-permeable sealing portion that encapsulates the plurality of light emitting elements, wherein:

the lead frame has a protruding portion protruding from the sealing portion parallel to the substrate, the protruding portion has at least one opening, and the supporting member has a projection to be fit in the opening of the protruding portion.

7. The optical distance measuring sensor as set forth in claim 1, wherein the position sensing photodetector has a light-receiving surface divided into minute zones having their respective resistances that increase from one end of the light-receiving surface to the other end.

8. The optical distance measuring sensor as set forth in claim 1, wherein the position sensing photodetector is a two-element photodiode having two light-receiving surfaces.

9. The optical distance measuring sensor as set forth in claim 1, wherein the controller outputs a signal according to a sum of quantities of light received by the position sensing photodetector.

10. The optical distance photodetector as set forth in claim 1, further comprising:

a photodetector different from the position sensing photodetector, wherein the controller further outputs a signal derived from the light-receiving photodetector.

11. The optical distance measuring sensor as set forth in claim 1, further comprising:

a pyroelectric sensor having a viewing angle corresponding to a viewing angle formed by the plurality of light emitting elements.

12. The optical distance measuring sensor as set forth in claim 1, wherein the plurality of light emitting elements are divided and arranged in at least two straight lines, and not together in one straight line.

13. A self-propelled cleaner equipped with the optical distance measuring sensor of claim 1.

14. An air conditioner equipped with the optical distance measuring sensor of claim 1.

* * * * *